US008849207B2

(12) United States Patent
Guey et al.

(10) Patent No.: US 8,849,207 B2
(45) Date of Patent: Sep. 30, 2014

(54) METHOD, APPARATUS AND SYSTEM FOR CHOOSING A PARAMETER SETTING FROM A SET OF AVAILABLE PARAMETER SETTINGS

(75) Inventors: Jiann-Ching Guey, Fremont, CA (US); Dennis Hui, Sunnyvale, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 564 days.

(21) Appl. No.: 13/237,325

(22) Filed: Sep. 20, 2011

(65) Prior Publication Data

US 2013/0072131 A1 Mar. 21, 2013

(51) Int. Cl.
*H04B 15/00* (2006.01)
*H04W 24/02* (2009.01)
*H04W 92/20* (2009.01)
*H04W 72/04* (2009.01)

(52) U.S. Cl.
CPC .............. *H04W 24/02* (2013.01); *H04W 92/20* (2013.01); *H04W 72/0406* (2013.01)
USPC ................ 455/62; 455/68; 370/252; 709/228

(58) Field of Classification Search
CPC ..... H04W 28/18; H04W 24/02; H04W 28/06; H04W 84/12; H04W 16/14; H04W 40/00; H04W 40/10; H04W 40/12; H04W 36/0094; H04L 1/0028; H04L 5/0094; H04L 69/24; H04L 45/00; H04L 2209/80; H04B 14/064; H04B 15/04; H04B 1/707; H04B 2201/7071; H04B 2215/065
USPC ......... 370/208, 210, 216, 221, 230, 241, 252, 370/310–312, 328, 329, 331, 332, 335, 338, 370/342, 352, 390, 392; 375/147, 219, 260, 375/340, 356; 455/41.1–41.3, 414.1, 420, 455/422.1, 423, 427, 428, 434, 436, 450, 455/457, 456.1, 458, 501, 522, 552.1, 455/553.1, 556.1, 62, 66.1, 67.11; 709/222, 709/223, 228, 230
See application file for complete search history.

(56) References Cited

U.S. PATENT DOCUMENTS

| | | | |
|---|---|---|---|
| 2007/0184858 A1* | 8/2007 | Landschaft et al. .......... 455/466 |
| 2010/0238884 A1 | 9/2010 | Borran et al. | |
| 2011/0182204 A1* | 7/2011 | Goto .............................. 370/252 |
| 2011/0238848 A1* | 9/2011 | Tachibana ..................... 709/228 |
| 2011/0306367 A1* | 12/2011 | Cahill ............................ 455/464 |

FOREIGN PATENT DOCUMENTS

| | | |
|---|---|---|
| EP | 2107838 A1 | 10/2009 |
| EP | 2175676 A1 | 4/2010 |

OTHER PUBLICATIONS

International Search Report and Written Opinion issued in application No. PCT/IB2012/054952 on Dec. 5, 2012, 15 pages.

* cited by examiner

*Primary Examiner* — Golam Sorowar
(74) *Attorney, Agent, or Firm* — Rothwell, Figg, Ernst & Manbeck, P.C.

(57) ABSTRACT

A system comprises a communication device that chooses a parameter setting from a set of available parameter settings. The system may include multiple communication devices, and each available parameter setting may have an associated cost. The communication device may receive parameter setting information from one or more other communication devices in the system, and the parameter setting information may identify the parameter setting being used by the one or more communication devices in the system. The communication device may choose a parameter setting that is associated with the lowest cost based on the parameter setting information received from the one or more other communication devices in the system.

20 Claims, 9 Drawing Sheets

METHOD, APPARATUS AND SYSTEM FOR CHOOSING A PARAMETER SETTING FROM A SET OF AVAILABLE PARAMETER SETTINGS

TECHNICAL FIELD

The disclosure herein relates to the field of parameter setting in a communications network.

BACKGROUND

A communications system (e.g., a communications network) commonly includes a number of communication devices, such as mobile communication devices (e.g., user equipments (UEs) or mobile access points) and non-mobile communication devices (e.g., fixed base stations). For instance, a wireless telecommunications network may include a number base stations.

In a communications network, it is sometimes necessary for a communication device to use a parameter setting that is distinguishable from those used by other communication devices that neighbor the communication device. For example, in a wireless telecommunications network, a base station may need to transmit a locally unique Reference Signal (RS) to enable UEs operating within the base station's cell to identify the cell and to synchronize to a downlink transmission. Accordingly, the base station may need to select (or have assigned) an RS that is different from the RSs used by the base station's neighboring base stations.

In another example, to reduce inter-cell interference, a base station should choose (or be assigned) a frequency band for transmission that is not being used by any neighboring base stations. This is the classical frequency planning methodology commonly practiced in second generation networks, such as the Global System for Mobile Communications (GSM).

There exists other occasions when a communication device may need to choose a parameter setting, such as a transmit power and beam direction, in such a way that the chosen parameter setting (e.g., transmit power and beam direction) is compatible with the parameter settings of neighboring communication devices in order to optimize performance of the entire network. In an example involving the heterogeneous network deployment of Long Term Evolution (LTE), base stations of different transmit power may selectively avoid transmitting data in certain time frames to reduce inter-cell interference. A number of patterns indicating the frames to be silenced are defined, and each base station may need to choose one that is most compatible with its neighbors' choices.

Accordingly, when designing a communications network in which a parameter setting used by a given communication device may negatively affect the performance of other communication devices depending on the parameter settings chosen by those other communication devices, it may be necessary to coordinate in a central fashion which communication device in the network will use a particular parameter setting. In many instances, these influences between communication devices are static in nature, and, thus, advanced planning during the build-out of the network can solve or reduce these interference problems. In existing cellular networks, for example, the parameters may be set by planning tools that have access to information such as communication device locations and radio propagation characteristics. Once an optimal network-wide solution is found, the parameter settings remain unchanged for an extended period until the deployment configuration changes.

While methods and devices to choose or assign parameter settings exist, there is, nonetheless, a desire for improving the selection of parameter settings.

SUMMARY

There exist situations in which a communication device operating in a network can improve a communication capability by changing a parameter setting. But, as described above, if the communication device changes a parameter setting, this change could negatively affect other parts of the network. Thus, it may be advantageous to coordinate the parameter settings of communications devices within the network. Without coordination, the communication devices may interfere with each other. Further, it is desirable for a communication device to have the ability to choose its own parameter settings without reliance on a central controller to oversee updating of parameter settings and assign a parameter setting to communication devices. Embodiments described herein solve the problem of parameter settings in a system of communication devices without a central controller. For example, in some embodiments, the problem of parameter settings without a central controller is solved by enabling communication devices to choose a parameter setting that reduces or minimizes interference in the network. Accordingly, embodiments may enable coordination of parameter settings in a system of communication devices in a distributed manner.

Some embodiments may provide a mechanism in which parameter settings are selected in a distributed and dynamic manner. It may also be advantageous, in some embodiments, to provide a unified framework for selecting parameter settings in a distributed network of communication devices. In some embodiments, the framework may be easily adapted to any of a wide range of specific applications. Some embodiments provide a mechanism with a computation formulation and information to be exchanged among communication devices that are common to a wide variety of problems for which the cost of setting the parameter to a certain value may be defined. In certain embodiments, the information to be exchanged among the communication devices may be a cost function (sometimes referred to as "impact" function) that indicates to the recipient of the information the cost of the recipient's parameter setting on the cost function of the communication device that transmits the information. In some embodiments, the computation formulation may be based on the weighted sum of the impact functions a communication device receives from its neighboring communication device.

In one particular aspect, a method for choosing a parameter setting is provided. In some embodiments, the method may be performed by a first communication device. The first communication device may be part of a system comprising the first communication device and a second communication device. The parameter setting may be chosen from a set of available parameter settings. The available parameters setting may comprise a first available parameter setting and a second available parameter setting. Each available parameter setting in the set of available parameter setting may have an associated cost. The method may include (a) receiving, by the first communication device, information transmitted by the second communication device. The information transmitted by the second communication device may comprise parameter setting information identifying a parameter setting being used by the second communication device.

In these embodiments, the method may also include (b) determining, by the first communication device, a first cost value using, at the least: (i) the first available parameter setting and (ii) the parameter setting being used by the second communication device. The method may further include (c) determining, by the first communication device, a second cost value using, at the least: (i) the second available parameter setting and (ii) the parameter setting being used by the second communication device. The method may additionally include (d) determining which available parameter setting, or settings, from the set of available parameter settings is associated with the lowest cost. The method may further include (e) choosing from the set of available parameter settings the available parameter setting determined in step (d) or one of the available parameter settings determined in step (d) if more than one available parameter setting is associated with the lowest cost.

In some embodiments, step (d) may comprise comparing a first total cost value with a second total cost value to determine whether the cost associated with the first available parameter setting is lower than the cost associated with the second available parameter setting. In some embodiments, the first total cost value may be the first cost value or is a value calculated using the first cost value and one or more other values, and the second total cost value may be the second cost value or is a value calculated using the second cost value and one or more other values. In some embodiments, the first total cost value equals the first cost value and the second total cost value equals the second cost value.

In some embodiments, the information transmitted by the second communication device further may comprise: (a) a third cost value representing a cost associated with the first communication device choosing the first available parameter setting and (b) a fourth cost value representing a cost associated with the first communication device choosing the second available parameter setting. In such embodiments, step (d) may further comprise: calculating the first total cost value using, at the least, the first cost value and the third cost value; and calculating the second total cost value using, at the least, the second cost value and the fourth cost value.

In such embodiments, the calculating the first total cost value may comprise summing the first cost value with the third cost value, and the calculating the second total cost value may comprise summing the second cost value and the fourth cost value. In such embodiments, the calculating the first total cost value may comprise summing (i) a value obtained by multiplying the first cost value with a first weight value and (ii) a value obtained by multiplying the third cost value with a second weight value, and the calculating the second total cost value may comprise summing (i) a value obtained by multiplying the second cost value with the first weight value and (ii) a value obtained by multiplying the fourth cost value with the second weight value.

In such embodiments, the calculating the third cost value may comprise using, at the least, the first available parameter setting, the parameter setting being used by the second communication device and a parameter setting being used by a third communication device; and the calculating the fourth cost value may comprise using, at the least, the second available parameter setting, the parameter setting being used by the second communication device and the parameter setting being used by the third communication device. In this embodiment, the first communication device may be a base station serving a first cell, the second communication device may be a base station serving a second cell that neighbors the first cell, and the third communication device may be a base station serving a third cell that neighbors the second cell but does not neighbor the first cell.

In some embodiments, the step (a) may further comprise receiving, by the first communication device, information transmitted by each of one or more communication devices in addition to the second communication device. The information transmitted by each of the one or more communication devices may comprise parameter setting information identifying a parameter setting being used by one of the one or more communication devices. In these embodiments, the step (b) may further comprise determining, by the first communication device, the first cost value using, at the least: (i) the first available parameter setting, (ii) the parameter setting being used by the second communication device and (iii) each parameter setting being used by the one or more communication devices. In these embodiments, the step (c) may further comprise determining, by the first communication device, the second cost value using, at the least: (i) the second available parameter setting, (ii) the parameter setting being used by the second communication device and (iii) each parameter setting being used by the one or more communication devices.

In some embodiments, the determining the first cost value does not use the second available parameter setting, and the determining the second cost value does not use the first available parameter setting. In some embodiments, the set of available parameter settings may comprise one of: (a) a set of available frequency bands, (b) a set of available reference signals, and (c) a set of available transmit powers. In some embodiments, the method may include (f) using, by the first communication device, the available parameter setting chosen in step (e)

In another aspect, a communication device comprising an apparatus for choosing a parameter setting to be used by the communication device is provided. In some embodiments, the parameter setting may be chosen from a set of available parameter settings comprising a first available parameter setting and a second available parameter setting. The apparatus may include a transceiver for transmitting and receiving information, and a data processing system coupled to the transceiver. In some embodiments, the apparatus may be configured such that the apparatus is operable to receive information transmitted by a second communication device. The information transmitted by the second communication device may comprise information identifying a parameter setting being used by the second communication device.

In these embodiments, the apparatus may also be configured such that the apparatus is operable to determine a first cost value using, at the least: (i) the first available parameter setting and (ii) the parameter setting being used by the second communication device. The apparatus may also be configured such that the apparatus is operable to determine a second cost value using, at the least: (i) the second available parameter setting and (ii) the parameter setting being used by the second communication device.

In these embodiments, the apparatus may further be configured such that the apparatus is operable to choose from the set of available parameter settings a parameter setting that minimizes a cost function. The choosing step may comprise comparing a first total cost value with a second total cost value to determine whether a cost of choosing the first available parameter is lower than a cost of choosing the second available parameter. The first total cost value may be the first cost value or is a value calculated using the first cost value and one or more other values, and the second total cost value may be the second cost value or is a value calculated using the second cost value and one or more other values.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments and, together with the description, further serve to enable a person skilled in the pertinent art to make and use, for example, a communication system disclosed herein as well as a method for choosing a parameter setting.

DETAILED DESCRIPTION

Figure 1:
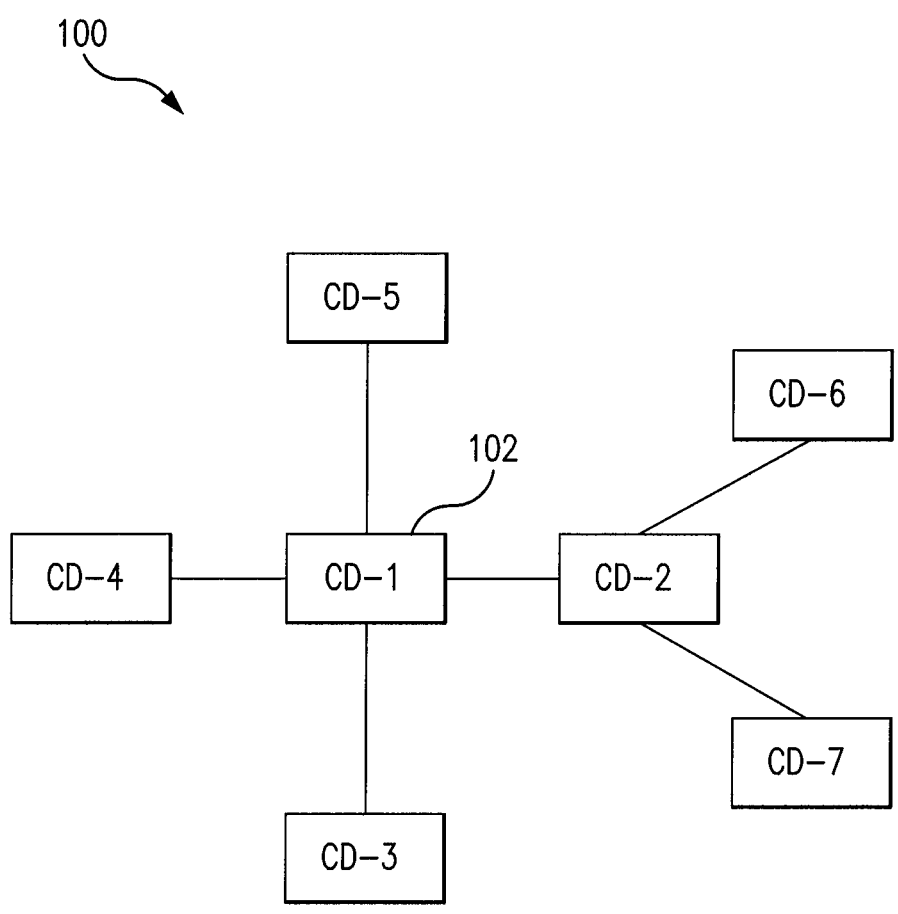
FIG. 1 illustrates an exemplary system of communication devices.

FIG. 1 illustrates an example system 100 (e.g., a wired or wireless communications network) of communication devices 102, according to some embodiments. Each communication device 102 may correspond to a router, a server, a base station, a user equipment (UE), or other communication device. In the example shown, system 100 includes a number of communication devices 102 (e.g., CD-1 through CD-7). Although seven communication devices 102 are shown in FIG. 1, system 100 may include more or fewer communication devices 102. In FIG. 1, a line between a first communication device (e.g., CD-1) and a second communication device (e.g., CD-2) indicates that the two communication devices are configured to communicate with each other (either directly or indirectly). Communication between communication devices 102 may be performed wirelessly and/or through the use of wires. Further, the omission of a line between any pair of communication devices 102 does not necessarily mean that no communication is possible between those communication devices 102.

In some embodiments, a communication device 102 of system 100 may choose a parameter setting from a set of available parameter settings. Further, the parameter setting chosen by the communication device 102 may depend on a parameter setting of one or more other communication devices 102. The communication device may choose the parameter setting so as to optimize system 100 by, for example, reducing and/or minimizing interference between the communication devices 102. In certain embodiments, the parameter setting may be, for example, a reference signal (RS) used by the communication device 102 to identify the communication device 102 and/or to synchronize a downlink transmission, a transmission frequency band, a transmit power, silenced transmission frames and/or a radio radiation beam direction. In certain embodiments, the parameter setting may be, for example, power control parameters, beamforming coefficients, reuse frequencies, coefficients used to program the receiver to suppress interference from a certain direction.

System 100 may be a wireless communications network, but other types of systems, such as systems for device to device communication or self-organizing networks, may alternatively be used. System 100 may facilitate wireless communication between a UE and a network. UEs may be, for example, mobile phones (i.e., handsets), wireless local loop (WLL) phones, computers with wireless internet connectivity, WiFi gadgets, and/or World Interopability of Microwave Access (WiMAX) gadgets. The network may use any wireless communication technology, such as Global System for Mobile Communications (GSM), code division multiple access (CDMA), WLL, wireless area network (WAN), WiFi and/or WiMAX.

Figure 2:
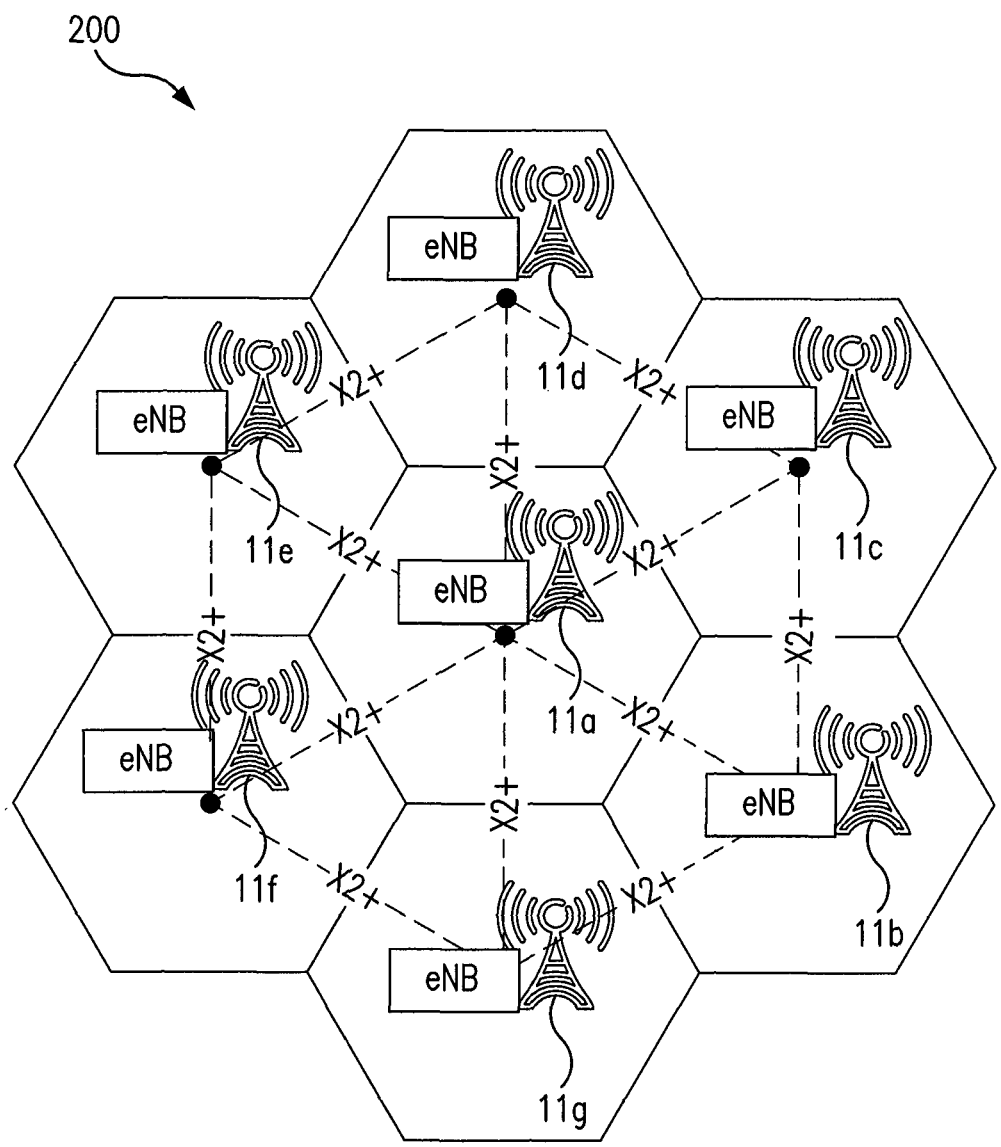
FIG. 2 illustrates an exemplary cellular network of communication devices.
Figure 3:
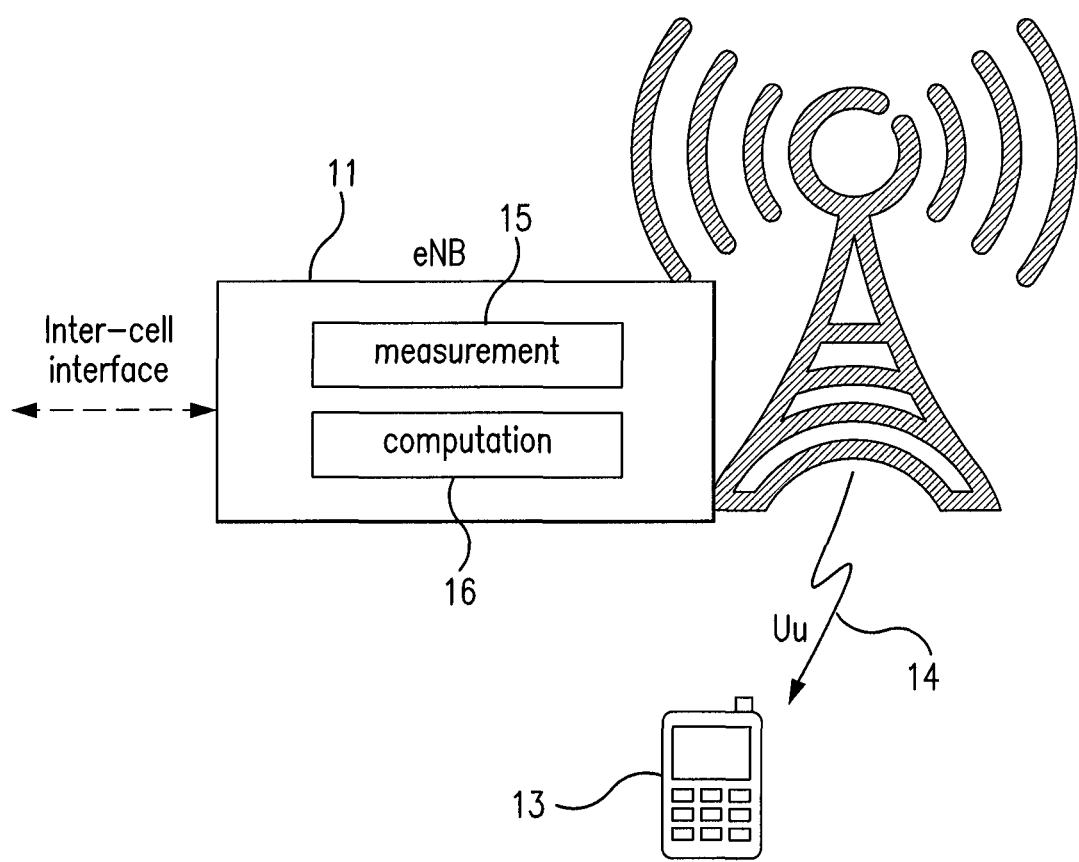
FIG. 3. illustrates an exemplary communication device.

FIGS. 2 and 3 illustrate a specific example of a system 100 according to an embodiment in which the system is a wireless communications network 200, and the communication devices are base stations 11. In the example shown in FIG. 2, wireless communications network 200 includes a number of base stations 11 (e.g., base stations 11 a through 11g). Although seven base stations 11 are shown in FIG. 2, system 200 may include more or fewer base stations 11.

As illustrated in FIG. 2, wireless communications network 200 may be a Long Term Evolution (LTE) radio access network in which the base stations 11 correspond to enhanced Node Bs (eNBs). Each of a plurality of eNBs 11a-11g may be connected to its neighboring eNBs through an enhanced inter-cell interface (X2+), which is illustrated with dashed lines in FIG. 2. Each eNB is illustrated within a cell representing the eNB's effective coverage area. In existing LTE networks, an inter-cell X2 interface between the eNBs may be utilized to support inter-eNB handover. In certain embodiments, the X2 interface may be extended to carry measurements and computational information between the eNBs required to dynamically update parameter settings. In FIG. 2, the extended X2 interface is denoted as the X2+ interface. The X2+ interface is not limited to a switched link directly between the eNBs as illustrated in FIG. 2. In other embodiments, the X2+ interface may be, for example, a link relayed by the UEs over the Uu interface, or a link relayed over the S1 interface by another network entity, such as a Serving Gateway (S-GW) or Mobility Management Entity (MME). Although wireless communications network 200 is shown in FIG. 2 as being divided into hexagonal cells, other shapes (e.g., square, triangular, circular and irregular) may alternatively be used. As illustrated in FIG. 3, the communication device (e.g., eNB 11) may communicate with a UE 13 over a Uu interface 14. The eNB 11 may be enhanced to send measurements 15 and parameter computations 16 over the inter-cell X2+ interface to other communication devices.

Referring back to FIG. 1, each communication device 102 in system 100 may be identified by a unique index i, where i=1, 2, . . . , or n. For example, communication device CD-1 in the system 100 may be identified by the unique index 1. A parameter setting $P_i$ may be associated with the communication device identified by the unique index i. In the description below, the variable parameter setting $P_i$ is denoted in uppercase, and the value the variable takes on is denoted in normal lower case as $p_i^n$, where the superscript n indicates the time index. In some embodiments $P_i$ may be a scalar variable or it may be an array variable. Accordingly, $p_i$ may be a only single value or it may be a set of two or more values.

In some embodiments, the parameter setting p″ of a communication device 102 is chosen or set to reduce or minimize interference in the system 100. In some embodiments, a parameter setting of the communication devices 102 in system 100 is chosen or set in a manner to achieve a certain performance measure as time progresses. In some embodiments, it is assumed that the performance measure, or cost function, is defined over any set of communication devices in the system 100.

In some embodiments, each communication device 102 may have a list of neighbors. Each communication device 102 can have any number of neighbors. In other words, each communication device may have n neighbors where n is an integer greater than or equal to one. A communication device's neighbor may be any communication device that may be affected by the parameters set by the communication device. The neighbor list may be determined by a proximity measure, such as, for example, distance or intensity of radio interference. The neighbor list may be statically determined at the time of deployment or dynamically changed as interference conditions change due to traffic re-distribution. In some embodiments, the list of neighbors may be established in any manner described in U.S. application Ser. No. 13/072,496, which is incorporated by reference herein in its entirety.

In the description below, $N_i$ denotes the set of neighbors of communication device i, and $A_i = i \cup N_i$ denotes the union of communication device i with its neighboring nodes. For example, in the system 100 shown in FIG. 1, the set of neighbors of communication device CD-1 (i.e., $N_1$) includes communication devices CD-2 through CD-5. Thus, in the example shown in FIG. 1, $A_1$ includes communication devices CD-1 through CD-5. For another example, in the system 200 shown in FIG. 2, the set of neighbors of communication device 11a (i.e., $N_{11a}$) includes communication devices 11b through 11g. Thus, in the example shown in FIG. 2, $A_{11a}$ includes communication devices 11a through 11g. In the description below, the set of communication devices $A_i$ will be referred to as the local network with respect to communication device i. In some embodiments, it may be assumed that the neighboring relationship is reciprocal. In these embodiments, a first communication device is a neighbor of a second communication device if and only if the second communication device is a neighbor of the first communication device, i.e., $j \in \mathcal{N}_i$ if and only if $i \in \mathcal{N}_j$.

In some embodiments, each communication device i may be capable of communicating with its neighboring communication devices to exchange parametric information required to evaluate a cost function defined for its local network. One example of a cost function $C_{\mathcal{A}_i}$ is given by:

$$C_{\mathcal{A}_i(P_j | j \in \mathcal{A}_i)} = C_{\mathcal{A}_i(P_i, P_j | j \in \mathcal{N}_i)} \quad (1)$$

Figure 4:
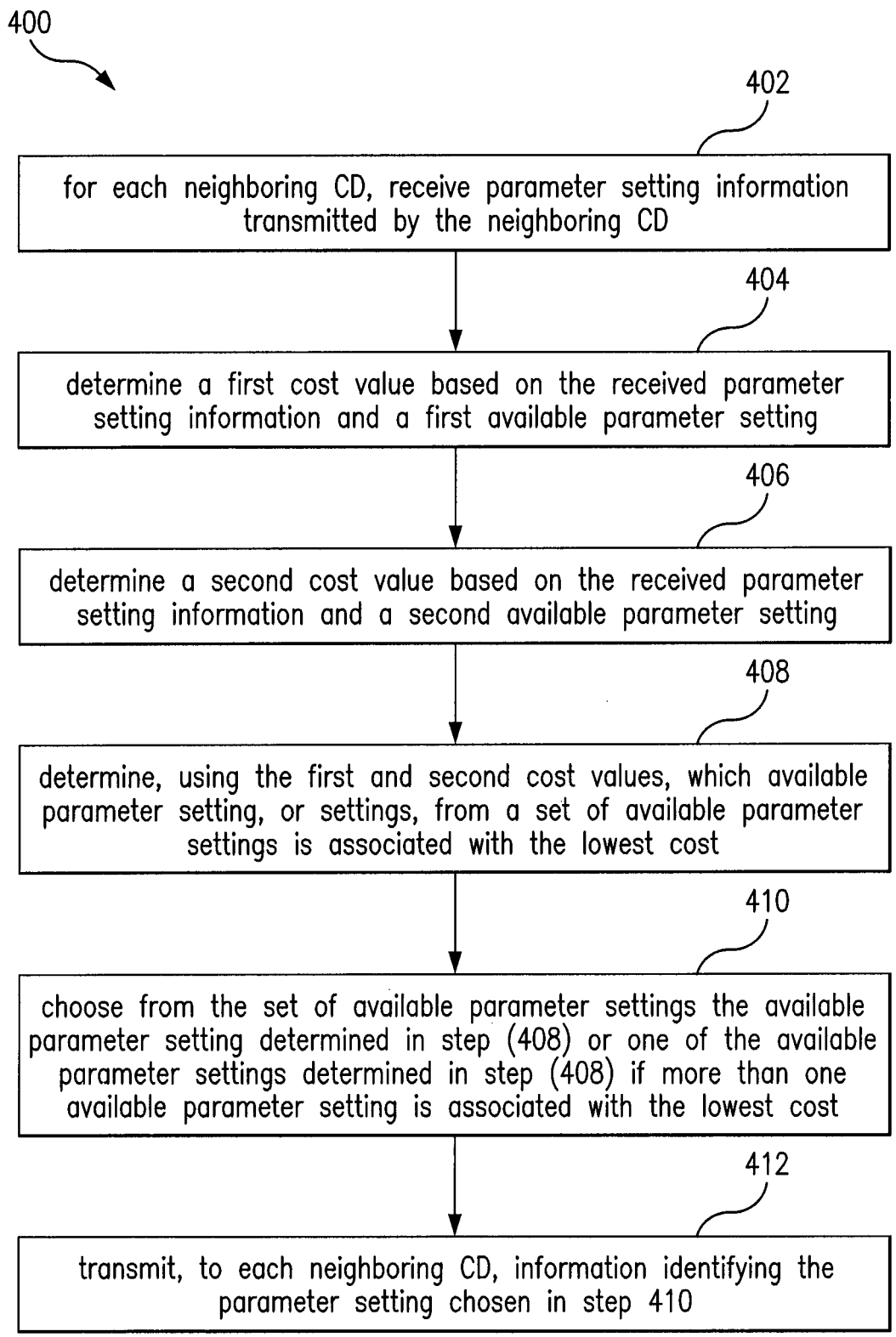
FIG. 4 is a flow chart illustrating a process according to an embodiment.

FIG. 4 is a flow chart illustrating a process 400, according to some embodiments, that may be performed by a communication device 102 (e.g., communication device CD-1 of FIG. 1 or communication device 11a of FIG. 2). Process 400 may begin in step 402, where a communication device 102 (referred to as the "first communication device" for clarity), for one or more neighboring communication device(s) 102, receives parameter setting information transmitted by the neighboring communication device 102. The parameter setting information received by the first communication device from a neighboring communication device may identify one or more parameter settings being used by the neighboring communication device 102. For example, in the system 100 shown in FIG. 1, communication device CD-1 may receive parameter setting information from communication device CD-2 identifying a parameter setting (e.g., a parameter setting array) being used by the communication device CD-2. Communication device CD-1 may also receive parameter setting information from communication devices CD-3, CD-4, ..., CD-n identifying parameter settings being used by the communication devices CD-3, CD-4, ..., and CD-n, respectively. For another example, in the system 200 shown in FIG. 2, communication device 11a may receive parameter setting information from each of communication devices 11b through 11f identifying the parameter settings being used by the communication devices 11b through 11f, respectively.

In step 404, the first communication device 102 may determine a first cost value. The first cost value may be determined using: (i) a first available parameter setting from a set of available parameters settings from which the communication device 102 may choose a parameter setting and (ii) one or more parameter settings being used by the neighboring communication devices as identified by the parameter setting information received from those neighboring communication devices. In some embodiments, the set of available parameters is a finite set, and, in determining the first cost value, the first communication device does not use any other available parameter setting included in the set of available parameter settings (unless, of course, the available parameter setting is being used by one of its neighbors).

For example, in the system 100 shown in FIG. 1, communication device CD-1 may determine a first cost value based on (i) a first available parameter setting from the set of available parameter settings and (ii) a parameter setting being used by one or more neighboring communication devices (e.g., one or more of CD-2 through CD-5), as identified by parameter setting information received from the neighboring communication devices.

In step 406, the first communication device 102 may determine a second cost value. The second cost value may be determined using: (i) a second available parameter setting from the set of available parameter settings and (ii) one or more parameter settings being used by the neighboring communication devices as identified by received parameter setting information.

For example, in the system 100 shown in FIG. 1, communication device CD-1 may determine a second cost value based on (i) a second available parameter setting from the finite set of available parameter setting and (ii) a parameter setting being used by neighboring communication devices CD-2 and CD-3, as identified by the parameter setting information received from communication devices CD-2 and CD-3, respectively. If communication devices CD-4 and CD-5 are also neighboring communication devices, the second cost value determined by communication device CD-1 may also be based on a parameter setting being used by neighboring communication devices CD-4 and CD-5, as identified by the parameter setting information received from communication devices CD-4 and CD-5, respectively.

Although not shown in FIG. 4, process 400 may have one or more additional steps corresponding to step 404 or 406 in which the first communication device 102 determines an additional cost value for each available parameter setting from the finite set of available parameter settings in addition to the first and second available parameter settings. The additional cost value may be determined using (i) the additional available parameter setting and (ii) a parameter setting being used by the neighboring communication devices as identified by the received parameter setting information. For example, if the set of available parameter settings includes n available parameter settings (n>2), the first communication device 102 may determine n cost values, each cost value corresponding to one of the n available parameter settings.

In step 408, the first communication device 102 may determine which available parameter setting, or settings, from the set of available parameter settings is associated with the lowest cost. For instance, in an example where the first communication device 102 may choose to use either of first and second available parameter settings, the first communication device 102 may determine which of the first and second available parameter settings is associated with the lowest cost. In an example where the first communication device 102 may be set to one of four available parameter settings, the first communication device 102 may determine which of the first through fourth available parameter settings is associated with the lowest cost.

In step 408, the first communication device 102 may compare a first total cost value with a second total cost value to determine whether the cost associated with the first available parameter setting is lower than the cost associated with the second available parameter setting. The first total cost value may be calculated using the first cost value, and the second total cost value may be calculated using the second cost value.

In some embodiments, the first total cost value may equal the first cost value, and the second total cost value may equal the second cost value. In this embodiment, in an example where the first communication device 102 choose to use either of first and second available parameter settings, the first communication device 102 may determine which of the first and second available parameter settings is associated with the lowest cost by comparing the determined first cost value to the determined second cost value. In an example where the first communication device 102 may be set to one of four available parameter settings, the first communication device 102 may determine which of the first through fourth available parameter settings is associated with the lowest cost by comparing first through fourth cost values with each other.

In step 410, the first communication device 102 may choose from the set of available parameter settings the available parameter setting determined in step 408 (or one of the available parameter settings determined in step 408 if more than one available parameter setting is associated with the lowest cost). In some embodiments, step 410 may additionally comprise updating the parameter setting of the first communication device 102 by setting the chosen available parameter setting as the parameter setting being used by the first communication device 102.

In the embodiment where the first total cost value may equal the first cost value, and the second total cost value may equal the second cost value, a communication device 102 may choose a parameter setting (e.g., a particular set of parameter settings) based on the parameter setting information received from its neighboring nodes according to:

$$p_i^{n+1} = \underset{P_i}{\mathrm{argmin}}\, C_{\mathcal{A}_i}(P_i \mid P_j = p_j^n, \forall\, j \in \mathcal{N}_i). \quad (2)$$

In other words, a communication device 102 may select its parameter setting ($p^{n+1}$) as one that minimizes the cost function of its local network assuming that the parameter values of its neighboring nodes remain the same as previously communicated.

In some embodiments, process 400 may include a step 412 in which the first communication device 102 may transmit, to each neighboring communication device 102, parameter setting information identifying the parameter setting ($p^{n+1}$) chosen in step 410. In this way, the updated parameter setting of the first communication device 102 may be communicated to the neighboring communication devices. In some embodiments, the neighboring communication devices may each choose a parameter setting ($p^{n+1}$) by performing process 400. Accordingly, each communication device 102 in the system 100 may update its parameter setting using process 400 and equation (2) set forth above.

In some embodiments, the communication device 102 may repeat process 400 one or more times. In some embodiments, a communication device 102 updates its parameter setting periodically. However, this is not necessary. In other embodiments, a communication device 102 may choose/update its parameter setting at randomly selected instants or occasionally. The timing(s) at which one or more communication devices 102 of a system 100 chooses their parameter settings may be selected to improve convergence behavior. The timings may be selected, for instance, in any manner described in U.S. application Ser. No. 13/072,496, which is incorporated by reference herein in its entirety.

Figure 5:
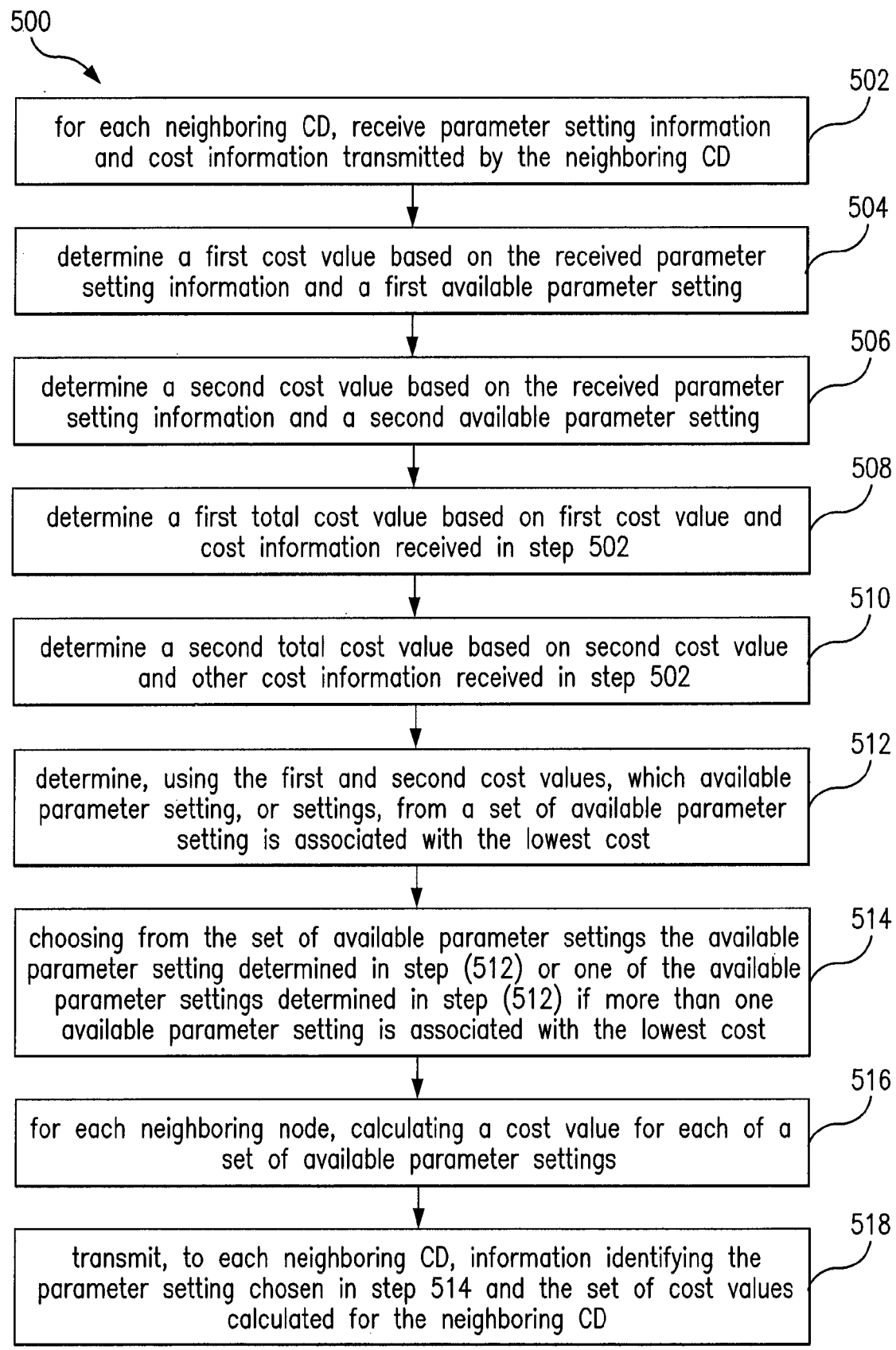
FIG. 5 is a flow chart illustrating a process according to an embodiment.

FIG. 5 is a flow chart illustrating a process 500, according to another embodiment, that may be performed by a communication device 102 (e.g., communication device CD-1 of FIG. 1 or communication device 11a of FIG. 2). Process 500 may begin in step 502, where a first communication device 102, for each neighboring communication device, receives (i) parameter setting information and (ii) cost information transmitted by the neighboring communication device(s) 102. The parameter setting information transmitted by a neighboring communication device may identify a parameter setting ($p^n$) being used currently by the neighboring communication device 102. The cost information transmitted by a neighboring communication device may include a cost value for each available parameter setting included in a finite set of available parameters settings from which the first communication device 102 may choose an available parameter setting. The cost value for each available parameter setting included in the set of available parameter settings may represent a cost associated with the first communication device 102 choosing that available parameter setting.

For example, in the system 100 shown in FIG. 1, the cost information received by communication device CD-1 from communication device CD-2 may include (a) a cost value representing a cost associated with communication device CD-1 choosing a first available parameter setting (this cost value is referred to in this example as the "third" cost value) and (b) a cost value representing a cost associated with communication device CD-1 choosing a second available parameter setting (this cost value is referred to in this example as the "fourth" cost value). Similarly, the cost information received by communication device CD-1 from communication device CD-3 may include (a) a cost value representing a cost associated with communication device CD-1 choosing the first available parameter setting (this cost value is referred to in this example as the "fifth" cost value) and (b) a cost value representing a cost associated with communication device CD-1 choosing the second available parameter setting (this cost value is referred to in this example as the "sixth" cost value).

In step 504, the first communication device 102 may determine a first cost value. The first cost value may be determined using: (i) the first available parameter setting and (ii) a parameter setting being used by the neighboring communication devices as identified by the received parameter setting information.

In step 506, the first communication device 102 may determine a second cost value. The second cost value may be determined using: (i) the second available parameter setting and (ii) the parameter settings being used by the neighboring communication devices as identified by the received parameter setting information.

Although not shown in FIG. 5, process 500 may have one or more additional steps corresponding to step 504 or 506 in which the first communication device 102 determines a cost value for each available parameter setting included in the set of available parameter settings in addition to the first and second available parameter settings. The additional cost value may be determined using (i) the additional available parameter setting and (ii) the parameter settings being used by the neighboring communication devices as identified by the received parameter setting information.

In step 508, the first communication device 102 may determine a first total cost value. The first total cost value may be calculated using (i) the first cost value determined in step 504 and (ii) the cost value(s) received from the neighboring communication devices representing the cost associated with the first communication device 102 choosing the first available parameter setting. Accordingly, in the example where the first communication device 102 is communication device CD-1, the communication device CD-1 may calculate a first total cost value using (i) the first cost value determined in step 504, (ii) the third cost value received from communication device CD-2 representing the cost associated with communication device CD-1 choosing the first available parameter setting and (iii) the fifth cost value received from communication device CD-3 representing the cost associated with the first communication device CD-1 choosing the first parameter setting.

In some embodiments, the first total cost value may be the sum of (i) the first cost value determined in step 504 and (ii) the cost value(s) received from the neighboring communication devices representing the cost associated with the first communication device 102 choosing the first available parameter setting. In some embodiments, the first total cost value may be the sum of (i) the first cost value determined in step 504 and (ii) a weighted sum of the cost value(s) received from the neighboring communication devices representing the cost of the first communication device 102 choosing the first available parameter setting.

In step 510, the first communication device 102 may determine a second total cost value. The second total cost value may be calculated using (i) the second cost value determined in step 506 and (ii) the cost value(s) received from the neighboring communication devices representing the cost of associated with the first communication device 102 choosing the second available parameter setting. Accordingly, in the same example where the first communication device 102 is communication device CD-1, the communication device CD-1 may calculate a second total cost value using (i) the second cost value determined in step 506, (ii) the fourth cost value received from communication device CD-2 representing a cost associated with communication device CD-1 choosing the second available parameter setting and (iii) the sixth cost value received from communication device CD-3 representing a cost associated with the first communication device CD-1 choosing the second available parameter setting.

In some embodiments, the second total cost may be a sum of (i) the second cost value determined in step 506 and (ii) the cost value(s) received from the neighboring communication devices representing the cost of the first communication device 102 choosing the second available parameter setting. In some embodiments, the second total cost may be the sum of (i) the second cost value determined in step 506 and (ii) a weighted sum of the cost value(s) received from the neighboring communication devices representing the cost of the first communication device 102 choosing the second available parameter setting.

Although not shown in FIG. 5, process 500 may have one or more additional steps corresponding to step 508 or 510 in which the first communication device 102 determines a total cost value for each available parameter setting from the set of available parameter settings in addition to the first and second available parameter settings. An additional total cost value may be calculated using (i) an additional cost value determined for the additional available parameter setting (see, e.g., description of steps 504 and 506 above) and (ii) the cost value(s) received from the neighboring communication devices representing the cost of the first communication device 102 choosing the additional available parameter setting.

In step 512, the first communication device 102 may determine, using the first and second total cost values (and any additional total cost values, if any), which available parameter setting, or settings, from the set of available parameter settings is associated with the lowest cost. For instance, in an example where the first communication device 102 chooses one of x number of available parameter settings (e.g., x>1), the first communication device 102 may determine which one or more of the n available parameter settings is associated with the lowest cost. For example, in performing step 512, the first communication device 102 may compare the first total cost value with the second total cost value to determine whether the cost associated with the first available parameter setting is lower than the cost associated with the second available parameter setting.

In step 514, the first communication device 102 may choose from the set of available parameter settings the available parameter setting determined in step 512 or one of the available parameter settings determined in step 512 if more than one available parameter setting is associated with the lowest cost. In some embodiments, immediately after performing step 514 the communication device begins to use the selected parameter setting.

In an embodiment, in performing steps 502-514 of process 500, a communication device 102 may choose its parameter value according to:

$$p_i^{n+1} = \operatorname*{argmin}_{P_i} \sum_{j \in \mathcal{A}_i} w_j C_{\mathcal{A}_j}(P_i \mid P_k = p_k^n, \forall k \in \mathcal{A}_j - \{i\}). \quad (3)$$

That is, a communication device i may select its parameter setting as the one that minimizes the weighted sum of the cost functions corresponding to the local networks of the communication devices in $A_i$ (the local network of the first communication device i), assuming all other parameter settings remain the same as previously communicated.

To evaluate equation (3), it can be rewritten as:

$$p_i^{n+1} = \operatorname*{argmin}_{P_i} \sum_{j \in \mathcal{A}_i} w_j C_{\mathcal{A}_j}(P_i \mid P_k = p_k^n, \forall k \in \mathcal{A}_j - \{i\}) \quad (4)$$

$$= \operatorname*{argmin}_{P_i} \left( \begin{array}{c} w_i C_{\mathcal{A}_i}(P_i \mid P_k = p_k^n, \forall k \in \mathcal{N}_i) + \\ \sum_{j \in \mathcal{N}_i} w_j C_{\mathcal{A}_j}(P_i \mid P_k = p_k^n, \forall k \in \mathcal{A}_j - \{i\}) \end{array} \right).$$

The first term in the second equation in (4) is the cost function associated with the local network of the communication device i and can therefore be readily evaluated for all possible values of $P_i$ because the communication device i has access to the local network's current parameter settings (e.g., via the parameter setting information received in step 502 for each neighboring communication device and identifies the parameter setting being used by the neighboring communication device) and the formulation of the corresponding cost function. The second term in second equation in (4) is the weighted sum of the cost functions corresponding to the local networks of the neighboring communication devices 102 in $N_i$. In some embodiments, the first communication device i may, in general, have no direct access to information required to evaluate these functions. However, the first communication device i may nonetheless evaluate these functions using the cost information received from each of the neighboring communication devices 102 in $N_i$ in step 502.

At time instant n, after updating its own parameter, each communication device j in the neighbor list $N_i$ of the first communication device i may compute a cost information according to the following impact function:

$$I_{j \to i}^n(P_i) = C_{\mathcal{A}_i}(P_i | P_k = p_k^n, \forall k \in \mathcal{A}_j - \{i\}) \quad (5)$$

for all possible values of $P_i$ conditioned on $p_k^n$ for $k \in \mathcal{A}_j - \{i\}$ and pass that cost information to the first communication device i. The receiving of the calculated cost information by the first communication device i may occur in step 502 of process 500. The calculation of the cost information each communication device j in the neighbor list $N_i$ of the first communication device i may correspond to the calculation of cost information in step 516 of process 500, which is described in further detail below. Equation (4) can then be rewritten as $$p_i^{n+1} = \underset{P_i}{\mathrm{argmin}}\left( w_i C_{\mathcal{A}_i}(P_i | P_k = p_k^n, \forall k \in \mathcal{N}_i) + \sum_{j \in \mathcal{N}_i} w_j I_{j \to i}^n(P_i) \right). \quad (6)$$

Accordingly, first communication device i has all the information needed to evaluate equation (4) at instant n+1 and update its parameter subsequently (e.g., in step 514 of process 500).

In this way, when a first communication device i chooses its parameter value according to equation (3), process described above essentially incorporates additional dependency from communication devices that are neighbors to the first communication device i's immediate neighbors. It is similar to (but generally not the same as) an embodiment using equation (2) with an extended neighbor list:

$$\mathcal{A}_i' = \bigcup_{j \in \mathcal{A}_i} \mathcal{A}_j \quad (7)$$

in place of $A_i$ in equation (2). However, the embodiment using equation (3) may have advantages in cases when communicating with additional tier of neighbors in $\mathcal{A}_i'$ may incur unacceptable latency or hardware cost or when the method for evaluating the cost function of the extended set $\mathcal{A}_i'$ is not available.

In some embodiments, process 500 may include a step 516 in which, for each neighboring communication device 102, the first communication device 102 calculates a cost value for each available parameter setting from a set of available parameter settings from which the neighboring communication device 102 may choose an available parameter setting.

In some embodiments, process 500 may include a step 518 in which, for each neighboring communication device 102, the first communication device 102 transmits information identifying the parameter setting chosen in step 514. In some embodiments, information transmitted in step 518 may further include information identifying the cost values associated with the neighboring device that were determined in step 516. In this way, the neighboring communication devices 102 may each receive parametric information to perform process 500. In some embodiments, the neighboring nodes may each choose their parameter settings by performing process 500. Accordingly, each communication device 102 in the system 100 may choose its parameter setting using process 500 and equation (3) set forth above.

In some embodiments, a communication device 102 may repeat process 500 one or more times. In some embodiments, a communication device 102 chooses a parameter setting periodically. However, this is not necessary. In other embodiments, a communication device 102 may choose a parameter setting at randomly selected instants or occasionally. The timing(s) at which one or more communication devices 102 of a system 100 chooses their parameter settings may be selected to improve convergence behavior.

Some embodiments provide a generic framework that many different algorithms for distributed coordination of parameters may follow. Some embodiments may be applicable to a wide range of distributed algorithms and may be implemented in a wide range of systems with distributed architecture. In addition to the examples provided through the specification, embodiments may also be applied to other types of distributed systems, such as systems for device to device communication and to a self-organizing network.

Some embodiments may be applied to frequency reuse. Frequency reuse planning is a commonly encountered problem with systems of communication devices, such cellular networks. In order to avoid interference, the transmission bandwidth for each communication device in a cellular network may be restricted to one of a finite number of frequency bands that is distinct from those used by its neighbors. Frequency band allocation is often determined before deployment and remains static until new cells are deployed. However, a distributed solution for updating the frequency allocation is advantageous in cases where changes to network deployment happen much more frequently, especially when there is no central agent to perform the system wide reassignment.

Figure 6:
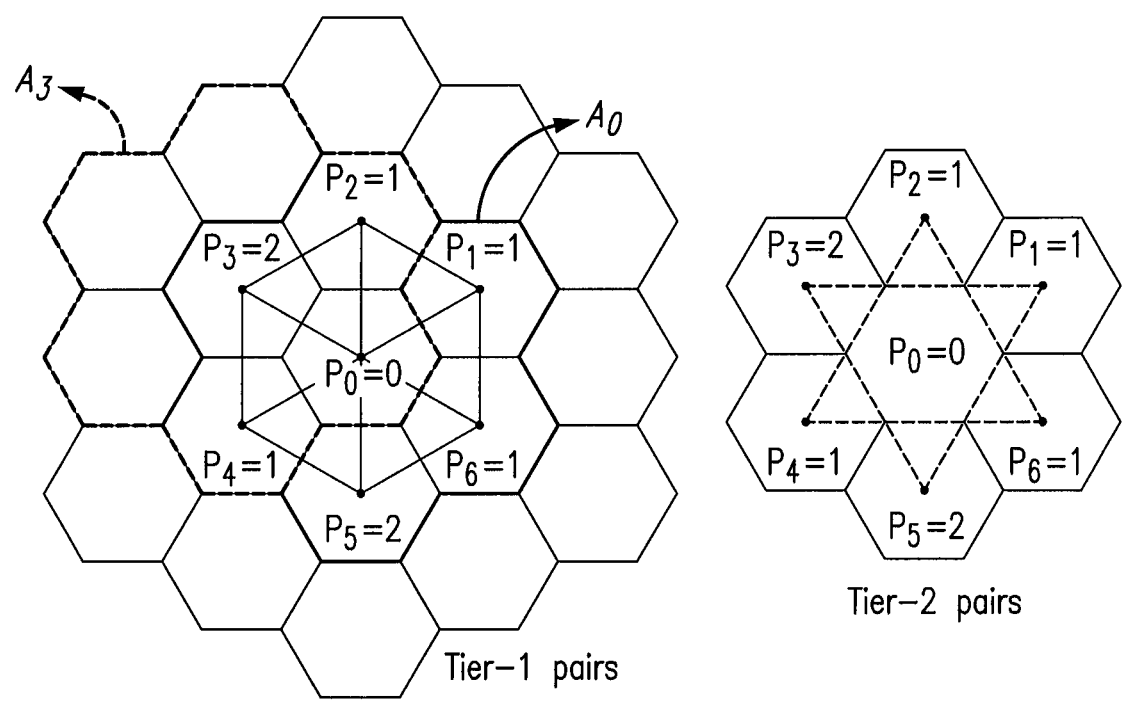
FIG. 6 illustrates an example system of communication devices to which embodiments may be applied for frequency reuse planning.

FIG. 6 illustrates an example system of communication devices to which embodiments may be applied for frequency reuse planning. In particular, FIG. 6 illustrates an example of reuse-3 planning where each communication device is to select one of three frequency bands that is different from those selected by its immediate neighbors.

The communication devices in the example shown in FIG. 6 have a hexagonal deployment. In the description below, $\Phi_1(\mathcal{A}_i)$ denotes the set of two-tuples (k, l) in $\mathcal{A}_i$ that are tier-1 neighbors to each other, and $\Phi_2(\mathcal{A}_i)$ denotes the set of two-tuples that are tier-2 neighbors to each other. In $\mathcal{A}_i$, there are 12 tier-1 communication device pairs and 6 tier-2 communication device pairs. The 12 tier-1 communication device pairs of $A_0$ are indicated by the solid lines in FIG. 6. The tier-1 communication device pairs in $A_0$ are (0,1), (0,2), (0,3), (0,4), (0,5), (0,6), (1,2), (2,3), (3,4), (4,5), (5,6) and (6,1). There are 6 tier-2 communication device pairs in $A_0$ are indicated by the dashed lines in FIG. 6. The tier-1 communication device pairs in $A_0$ are (1,3), (2,4), (3,5), (4,6), (5,1) and (6,2).

In a hexagonal deployment of communication devices using reuse-3 planning, the communication devices are at an optimal state when the tier-1 neighbors are different and the tier-2 neighbors are identical. A heuristic cost function for a hexagonal deployment of communication devices using reuse-3 planning can be expressed as:

$$C_{\mathcal{A}_i}(P_j \mid j \in \mathcal{A}_i) = \sum_{(k,l) \in \Phi_1(\mathcal{A}_i)} I(P_k = P_l) + 2 \times \sum_{(k,l) \in \Phi_2(\mathcal{A}_i)} I(P_k \neq P_l), \quad (8)$$

where I(•)=1 if the argument is true and 0 otherwise. In the example shown FIG. 6, for tier-1 communication device pairs are (1,2) and (6,1), the parameter settings p are equal (i.e., $p_1=p_2$ and $p_6=p_1$), and, for tier-2 pairs (1,3) and (5,1), the parameter settings p are not equal. Thus, in the example shown FIG. 6:

$$C_{\mathcal{A}_0}(p_0, p_1, \ldots, p_6) = 2 + 2 \times 2 = 6. \quad (9)$$

However, if $p_1$ were set to 2, the cost function would be zero, and the optimal solution would be reached. In this example, there are twice as many tier-1 neighbors as there are tier-2 neighbors, and the factor 2 weighted on the second term in equation (8) may be used to ensure that the tier-1 cost and the tier-2 cost weigh equally. In other words, the weighting is a design parameter that may be adjusted to control converging behavior.

Equation (8) may be used as the cost function in equation (2) or equation (3). Accordingly, in a frequency reuse embodiment, a communication device 102 in a system 100 may use equation (8) in either process 400 shown in FIG. 4 or process 500 shown in FIG. 5 to choose its parameter setting (e.g., transmission frequency band). Further, in a frequency reuse embodiment, each communication device 102 in a system 100 may use equation (8) in either process 400 shown in FIG. 4 or process 500 shown in FIG. 5 to choose their parameter settings.

Figure 7:
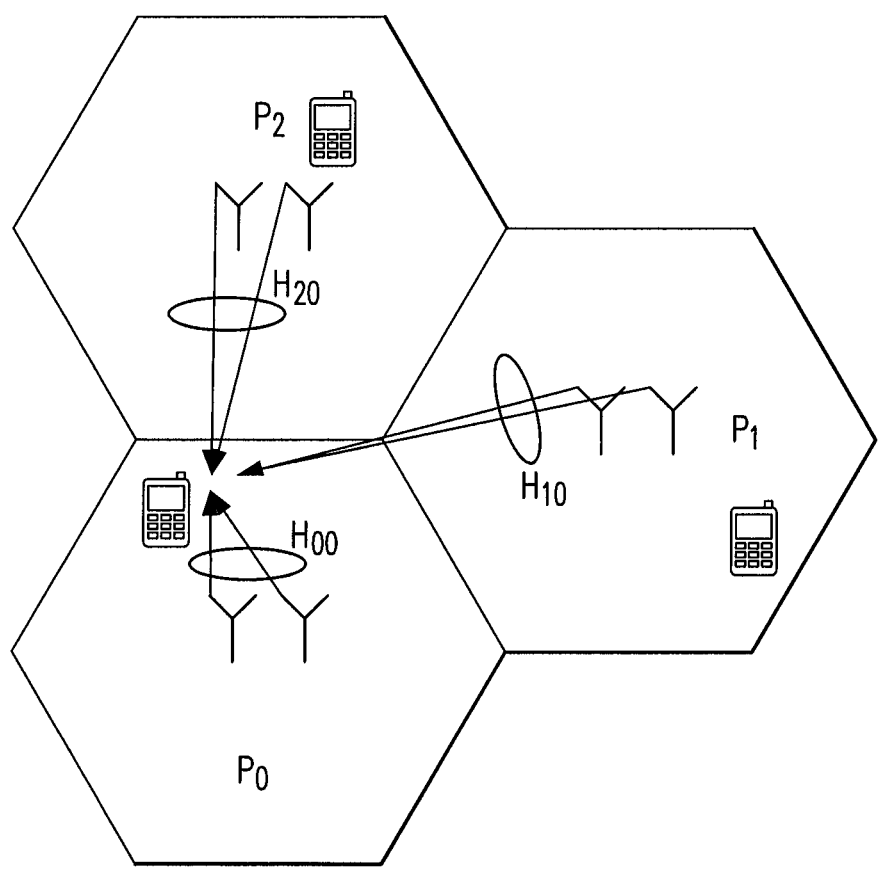
FIG. 7 is a diagram illustrating communication devices in a system according to a radiation beam selection embodiment.

Some embodiments may be applied to radiation beam selection. For example, some embodiments may be applied to radiation beam selection using the LTE standard. In LTE standard, sets of precoders have been defined for transmissions by communication devices (e.g., base stations) equipped with multiple antennas. Base stations equipped with multiple antennas are shown in FIG. 7. Some embodiments may be applied to enable different base stations to coordinate their transmission so that a certain global cost function is minimized. In an embodiment, the global cost function is the negative sum data throughput. However, other embodiments may use a different global cost function.

In the example shown in FIG. 7, $P_j$ may represent a $N_T \times 1$ precoding vector from a set S of pre-defined precoders (in uplink or downlink) for transmitting to a user or device served by node j. For LTE with two antennas ($N_T=2$) transmitting single stream of data, there are 4 precoding vectors in S to choose from. The available precoding vectors are:

$$\frac{1}{2}\begin{bmatrix}+1\\+1\end{bmatrix} \frac{1}{2}\begin{bmatrix}+1\\-1\end{bmatrix} \frac{1}{2}\begin{bmatrix}+1\\+\sqrt{-1}\end{bmatrix} \frac{1}{2}\begin{bmatrix}+1\\-\sqrt{-1}\end{bmatrix}. \quad (10)$$

In the description below, $H_{ji}$ denotes the $1 \times N_T$ multiple-input multiple-output (MIMO) channel response from communication device j to the user or device served by communication device i. Here, the cost function for the local network centered around communication device i may be given by:

$$C_{\mathcal{A}_i}(p_i \mid j \in \mathcal{A}_i) \equiv \quad (11)$$

$$-\log\left(1 + p_i^H H_{ii}^H \left(\sum_{j \in \mathcal{N}_i} H_{ji} p_j p_j^H H_{ji}^H + \sigma_i^2 I\right)^{-1} H_{ii} p_i\right).$$

Equation (11) may be used as the cost function in equation (2) or equation (3). Accordingly, in a radiation beam selection embodiment, a communication device 102 in a system 100 may use equation (11) in either process 400 shown in FIG. 4 or process 500 shown in FIG. 5 to choose its parameter setting (e.g., precoding vector). Further, in a radiation beam selection embodiment, each communication device 102 in a system 100 may use equation (11) in either process 400 shown in FIG. 4 or process 500 shown in FIG. 5 to choose their parameter setting.

Figure 8:
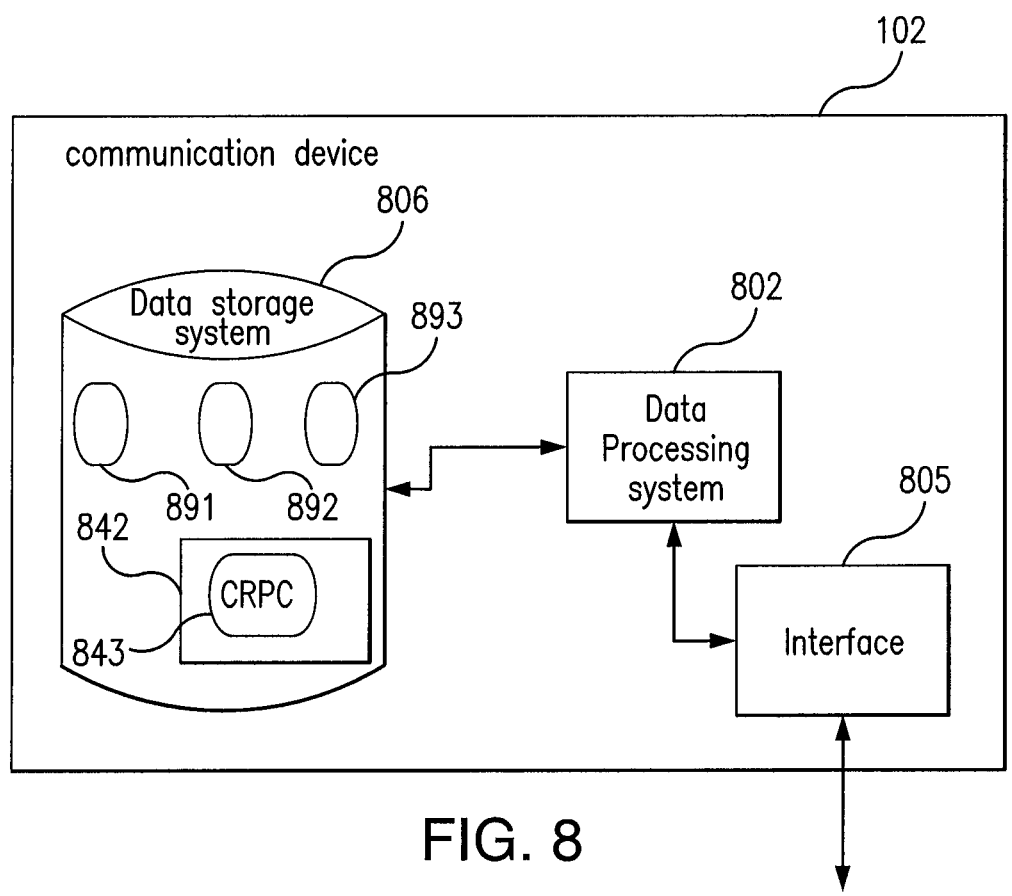
FIG. 8 is a block diagram of a particular embodiment of a communication device or components thereof.

FIG. 8 illustrates a possible implementation for at least some components of communication device 102 according to some embodiments. As shown in FIG. 8, communication device 102 may include: a data processing system 802, which may include one or more servers each having one or more microprocessors and/or one or more circuits, such as an application specific integrated circuit (ASIC), Field-programmable gate arrays (FPGAs), etc; a network interface 805 for receiving messages (e.g., messages transmitted from a second communication device) and transmitting messages; data storage system 806, which may include one or more computer-readable mediums, such as non-volatile storage devices and/or volatile storage devices (e.g., random access memory (RAM)). As shown, data storage system 806 may be used to store cost functions 891, received parameter setting information 892 and/or neighbor list(s) 893. In embodiments where data processing system 802 includes a microprocessor, a parameter setting selection computer program product is provided, which computer program product includes: computer readable program code 843, which implements a computer program, stored on a computer readable medium 842, such as, but not limited to, magnetic media (e.g., a hard disk), optical media (e.g., a DVD), memory devices (e.g., random access memory), etc. In some embodiments, computer readable program code 843 is configured such that, when executed by data processing system 802, code 843 causes the processing system to perform steps described above (e.g., steps describe above with reference to the flow charts shown in FIG. 4 or 5).

Figure 9:
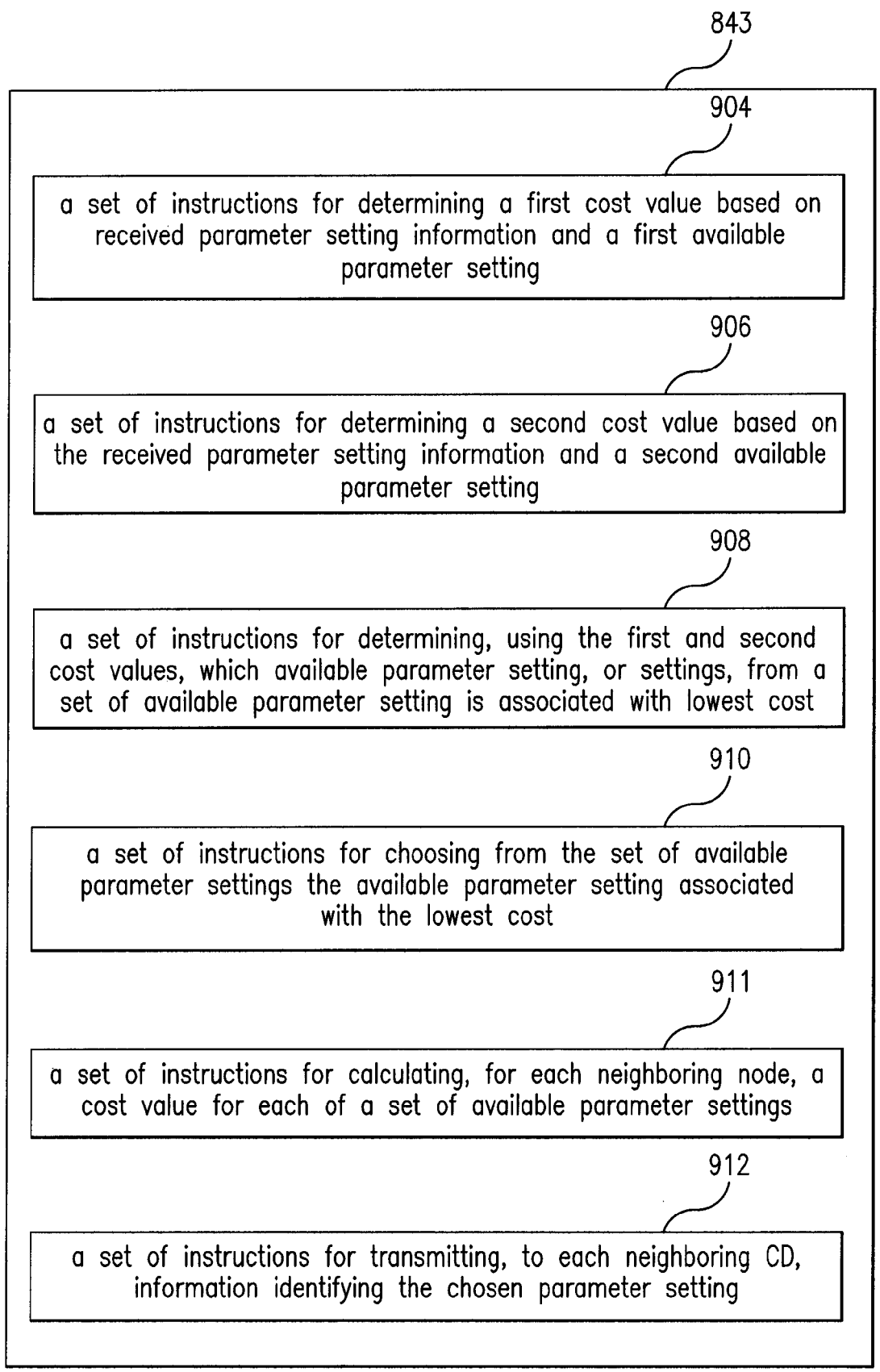
FIG. 9 is a block diagram illustrating example software components of a system for choosing a parameter setting according to some embodiments.

FIG. 9 illustrates an embodiment of a computer readable program code (CRPC) 843. In the embodiment shown, CRPC 843 includes a set of instructions 904 for determining a first cost value using: (i) a first available parameter setting included in a finite set of available parameter settings and (ii) parameter settings being used by neighboring communication devices as identified by received parameter setting information. CRPC 843 may also include a set of instructions 906 for determining a second cost value using: (i) a second available parameter setting included in a finite set of available parameter settings and (ii) parameter settings being used by neighboring communication devices as identified by received parameter setting information. Although not shown in FIG. 9, CRPC 843 may have one or more additional instruction sets corresponding to instruction sets 902 or 904 for determining an additional cost value for each available parameter setting included in the set of available parameter settings in addition to the first and second available parameter settings. The additional cost value may be determined using (i) the additional available parameter setting and (ii) the parameter settings being used by the neighboring communication devices as identified by the received parameter setting information.

CRPC 843 may additionally include a set of instructions 908 for determining, using at the least the first and second cost values, the available parameter setting, or settings, from a set of available parameter setting is associated with the lowest cost.

CRPC 843 may additionally include a set of instructions 910 for choosing from the set of available parameter settings the available parameter setting associated with the lowest cost.

CRPC 843 may include a set of instructions 911 for calculating, for each neighboring node, a cost value for each of a set of available parameter settings.

CRPC 843 may include a set of instructions 912 for transmitting, to each neighboring CD, information identifying the chosen parameter setting and information identifying the calculated cost values for the neighboring node.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. In a system comprising a first communication device and a second communication device, a method performed by the first communication device for choosing a parameter setting from a set of two or more available parameter settings comprising a first available parameter setting and a second available parameter setting, wherein each of the first and second available parameter settings has an associated cost, the method comprising:
    (a) receiving, by the first communication device, an information transmitted by the second communication device, the information transmitted by the second communication device comprising parameter setting information identifying a parameter setting being used by the second communication device;
    (b) determining, by the first communication device, a first cost value based on the first available parameter setting and the parameter setting being used by the second communication device;
    (c) determining, by the first communication device, a second cost value based on the second available parameter setting and the parameter setting being used by the second communication device;
    (d) determining, using the first and second cost value, which available parameter setting, or settings, from the set of available parameter settings is associated with a lowest cost;
    (e) choosing, from the set of available parameter settings, the available parameter setting determined in step (d) or one of the available parameter settings determined in step (d) if more than one available parameter setting is associated with the lowest cost, wherein
    the step (d) comprises comparing a first total cost value of the first available parameter setting with a second total cost value of the second available parameter setting to determine whether the cost associated with the first available parameter setting is lower than the cost associated with the second available parameter setting,
    the first total cost value is the first cost value or is a value calculated using the first cost value and one or more other values, and
    the second total cost value is the second cost value or is a value calculated using the second cost value and one or more other values; and
    (f) transmitting, by the first communication device, an information identifying the parameter setting chosen in step (e) to the second communication device.

2. The method of claim 1, wherein the first total cost value is the first cost value and the second total cost value is the second cost value.

3. The method of claim 1, wherein
the information transmitted by the second communication device further comprises: (a) a third cost value representing a cost associated with the first communication device choosing the first available parameter setting and (b) a fourth cost value representing a cost associated with the first communication device choosing the second available parameter setting; and
the step (d) further comprises:
    calculating the first total cost value using, at the least, the first cost value and the third cost value; and
    calculating the second total cost value using, at the least, the second cost value and the fourth cost value.

4. The method of claim 3, wherein
the step of calculating the first total cost value comprises summing the first cost value with the third cost value; and
the step of calculating the second total cost value comprises summing the second cost value and the fourth cost value.

5. The method of claim 3, wherein
the step of calculating the first total cost value comprises summing (i) a value obtained by multiplying the first cost value with a first weight value and (ii) a value obtained by multiplying the third cost value with a second weight value; and
the step of calculating the second total cost value comprises summing (i) a value obtained by multiplying the second cost value with the first weight value and (ii) a value obtained by multiplying the fourth cost value with the second weight value.

6. The method of claim 3, wherein
the third cost value was calculated using, at the least, the first available parameter setting, the parameter setting being used by the second communication device and a parameter setting being used by a third communication device,
the fourth cost value was calculated using, at the least, the second available parameter setting, the parameter setting being used by the second communication device and the parameter setting being used by the third communication device.

7. The method of claim 6, wherein
the first communication device is a base station serving a first cell,
the second communication device is a base station serving a second cell that neighbors the first cell, and
the third communication device is a base station serving a third cell that neighbors the second cell but does not neighbor the first cell.

8. The method of claim 1, wherein
the step (a) further comprises receiving, by the first communication device, information transmitted by each of one or more communication devices in addition to the second communication device, the information transmitted by each of the one or more communication devices comprising parameter setting information identifying a parameter setting being used by one of the one or more communication devices;

the step (b) further comprises determining, by the first communication device, the first cost value using, at the least: (i) the first available parameter setting, (ii) the parameter setting being used by the second communication device and (iii) each parameter setting being used by the one or more communication devices; and the step (c) further comprises determining, by the first communication device, the second cost value using, at the least: (i) the second available parameter setting, (ii) the parameter setting being used by the second communication device and (iii) each parameter setting being used by the one or more communication devices.

9. The method of claim 1, wherein the second available parameter setting is not used in determining the first cost value and the first available parameter setting is not used in determining the second cost value.

10. The method of claim 1, wherein the set of available parameter settings comprises one of: (a) a set of available frequency bands, (b) a set of available reference signals, and (c) a set of available transmit powers.

11. The method of claim 1, further comprising (f) using, by the first communication device, the available parameter setting chosen in step (e).

12. A communication device comprising an apparatus for choosing, from a set of available parameter settings comprising a first available parameter setting and a second available parameter setting, a parameter setting to be used by the communication device, the apparatus comprising:

a network interface for transmitting and receiving information; and a data processing system coupled to the network interface, wherein the data processing system is configured to:

receive from a second communication device an information identifying a parameter setting being used by the second communication device;

determine a first cost value based on the first available parameter setting and the parameter setting being used by the second communication device;

determine a second cost value based on the second available parameter setting and the parameter setting being used by the second communication device;

determine which available parameter setting, or settings, from the set of available parameter settings is associated with a lowest cost using the first cost value and the second cost value;

choose from the set of available parameter settings a parameter setting that minimizes a cost function by comparing a first total cost value of the first available parameter with a second total cost value of the second available parameter setting to determine whether a cost of choosing the first available parameter is lower than a cost of choosing the second available parameter, wherein the first total cost value is the first cost value or is a value calculated using the first cost value and one or more other values, and the second total cost is the second cost value or is a value calculated using the second cost value and one or more other values, and wherein the network interface configured to transmits an information identifying the chosen parameter setting to the second communication device.

13. The communication device of claim 12, wherein the first total cost value equals the first cost value and the second total cost value equals the second cost value.

14. The communication device of claim 12, wherein the data processing system is configured such that the data processing system is further operable to receive from the second communication device: (a) a third cost value representing a cost associated with the first communication device choosing the first available parameter setting and (b) a fourth cost value representing a cost associated with the first communication device choosing the second available parameter setting, the data processing system is configured to calculate the first total cost value using, at the least, the first cost value and the third cost value, and the data processing system is configured to calculate the second total cost value using, at the least, the second cost value and the fourth cost value.

15. The communication device of claim 14, wherein the data processing system is configured to calculate the first total cost value by, at the least, summing the first cost value and the third cost value, and the data processing system is configured to calculate the second total cost value by, at the least, summing the second cost value and the fourth cost value.

16. The communication device of claim 14, wherein the data processing system is configured to calculate the first total cost value by, at the least, summing: (i) a value obtained by multiplying the first cost value with a first weight value and (ii) a value obtained by multiplying the third cost value with a second weight value; and the data processing system is configured to calculate the second total cost value by, at the least, summing (i) a value obtained by multiplying the second cost value with the first weight value and (ii) a value obtained by multiplying the fourth cost value with the second weight value.

17. The communication device of claim 14, wherein the third cost value was calculated using, at the least, the first available parameter setting, the parameter setting being used by the second communication device and a parameter setting being used by a third communication device, the fourth cost value was calculated using, at the least, the second available parameter setting, the parameter setting being used by the second communication device and the parameter setting being used by the third communication device.

18. The communication device of claim 17, wherein the first communication devices is a base station serving a first cell, the second communication device is a base station serving a second cell that neighbors the first cell, and the third communication device is a base station serving a third cell that neighbors the second cell but does not neighbor the first cell.

19. The communication device of claim 12, wherein the data processing system is configured such that the data processing system is further operable to:

receive information transmitted by each of one or more communication devices in addition to the second communication device, the information transmitted by each of the one or more communication devices comprising parameter setting information identifying a parameter setting being used by one of the one or more communication devices;

determine the first cost value using, at the least: (i) the first available parameter setting, (ii) the parameter setting being used by the second communication device and (iii) each parameter setting being used by the one or more communication devices; and determine the second cost value using, at the least: (i) the second available parameter setting, (ii) the parameter setting being used by the second communication device and (iii) each parameter setting being used by the one or more communication devices.

20. The communication device of claim 12, wherein the set of available parameter settings comprises one of: (a) a set of available frequency bands, (b) a set of available reference signals, and (c) a set of available transmit powers.

* * * * *